Feb. 14, 1956 R. N. FUQUA 2,734,301
ARTIFICAL FISH BAIT
Filed Aug. 5, 1952

Inventor
Robert N. Fuqua,
by George H. Baldwin
His Attorney.

United States Patent Office 2,734,301
Patented Feb. 14, 1956

2,734,301

ARTIFICIAL FISH BAIT

Robert N. Fuqua, Jacksonville, Fla.

Application August 5, 1952, Serial No. 302,663

3 Claims. (Cl. 43—42.05)

My invention pertains to artificial fish bait, and more particularly, to a combination comprising a fish-shaped, hook-carrying plug and, movably attached thereto, an artificial wet fly, bucktail or similar lure, which also carries a hook.

An object of my invention is to provide a combination artificial bait which will be more successful in catching fish.

A more specific object of my invention is to provide a combination plug and artificial lure, the lure being of the feather, wet fly, or bucktail type, or the like, so interconnected and arranged as to give a particularly appealing action to the artificial lure portion and to add to the action and appeal of the plug portion. A further object is to provide a combination plug and artificial lure arrangement to be attached to a single line primarily adapted to casting wherein the artificial lure will not tangle or hook with the plug or line during a cast but wherein, following the cast, the artificial lure may trail at a distance from the plug. In accord with the invention, the plug and artificial lure are each provided with hooks.

Figure 1:
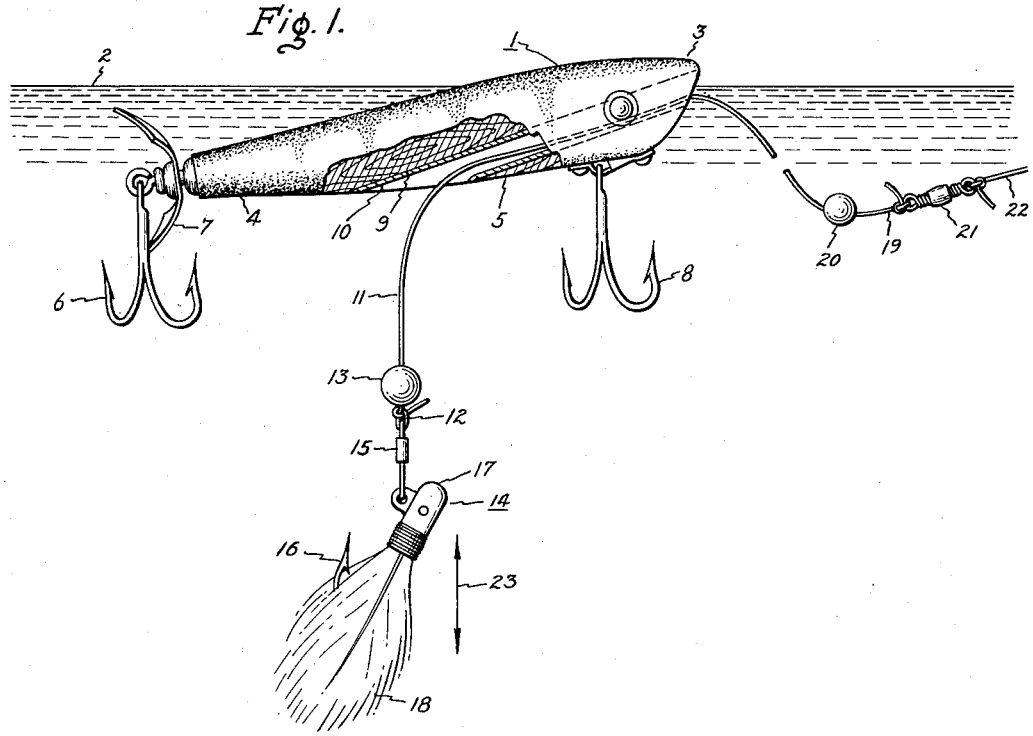
Figure 2:
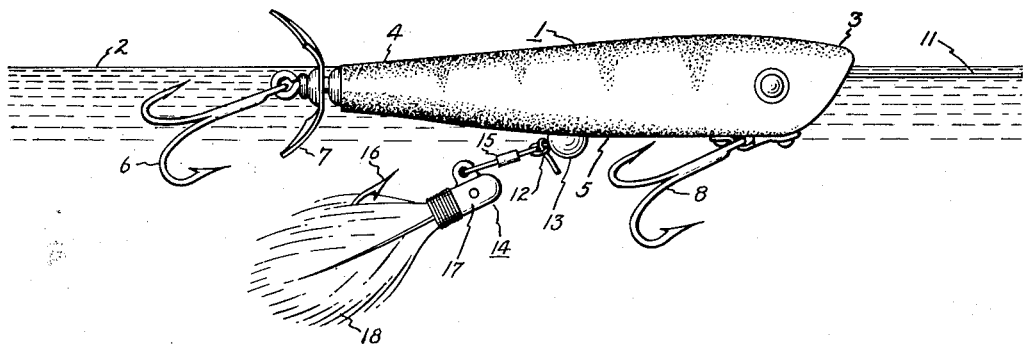

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawing, in which:

Fig. 1 is a side view of an artificial bait in accord with my invention, the plug portion being partially cut away, as arranged during one condition of operation; and Fig. 2 is a side view of a bait in accord with my invention in another condition of operation.

Turning now to Fig. 1, a buoyant plug or fish-shaped body 1 is shown floating at the surface of a body of water 2. The plug 1 is preferably formed of wood, but it may be of other desired buoyant material, and it is preferably of the top-water type. The plug comprises a leading or head end 3, a tail end 4 and an under body portion 5. A gang hook 6 is preferably attached at the tail of the plug, together with a spinner 7, as is known in the art. A similar three-gang hook 8 is affixed to the forward part of the under body portion and under the nose 3.

An elongated opening 9 extends through the plug from the upper portion of the nose 3 to an intermediate part of the under body portion 5. The after end of the opening, at the under body portion, is arranged to be aft of the center of buoyancy of the plug. It will be noted that the forward end of the plug shown is substantially larger than the aft or tail portions, and the opening 9 may, accordingly, have a trailing end approximately midway between the nose and tail of the plug. The plug preferably carries suitable external markings including an eye, or it is otherwise externally finished to be attractive to fish.

Opening 9 is preferably lined with a plastic or metal tube 10 or with a coating of enamel to prevent the absorption of water into the wood of which the plug is formed.

A leader 11, which may be about two or three feet in length for a 4 inch long plug, and which in any event is several times as long as the plug, extends freely through and loosely within the opening 9. The trailing end 12 of the leader is attached to hooked lure means comprising a ball or stop member 13 and a bucktail or similar lure 14. The ball 13 has a cross dimension greater than that of opening 9, whereby the ball and lure are prevented from sliding into opening 9. The particular position of ball 13 is desirable to prevent the knot of the leader, the attachment clip 15, or any other portion of the lure means from entering opening 9, since such portions might tend to catch within the opening. It will be apparent, however, that means for attaching the leader directly to a lure 14 may be provided which are smooth and not subject to catching within opening 9, and that, in this case, the lure 14 may comprise in itself an upper portion sufficiently large to serve as a stop means which will prevent the lure from entering or catching in opening 9.

In the particular construction shown, the upper end of lure 14 may be weighted, but, to insure desired sinking of the lure, it has been found preferable to utilize as a part of the lure means either a ball 13 of lead, or a sinker attached between the ball and lure 14, or both. It will be understood that the ball 13 may be of plastic, however, or of any other suitable material, if sufficient weight is otherwise provided, such as by sinkers or by weighting of the lure, to cause lure 14 to sink. The lure 14, in accord with my invention, comprises an at least partially hidden hook 16 firmly attached directly, or through an intermediate head portion 17, to clip 15. Fur, feathers, or the like, indicated at 18, are attached to shield and camouflage the hook. Various similar types of lures will suggest themselves for use at this trailing end of the leader of my device, and in calling for a lure at this position I intend to include that class which includes wet flies, bucktails, and similar furred or feathered lures, wherein a hook is preferably disposed in and hidden by the fur or feathers. The lure will be smaller than the plug. Furthermore, the lure will be of the type adapted to be fished below the water surface and not of a type designed for surface action.

The forward end 19 of the leader is provided with a ball 20, which is preferably not weighted, and immediately forward of the ball the leader end 19 is attached to a swivel 21 for joining to a fishing line 22. The ball 20 serves as a stop member and has a cross dimension sufficiently large to prevent its entrance into opening 9 of the plug. Its primary function is to prevent the swivel 21 or the knot at the forward end of the leader from entering and becoming caught in the opening 9. It will be apparent that the swivel 21 could be enlarged and designed to function as the stop means at the forward end of the leader, thereby making the separate stop means 20 unnecessary.

As seen in Fig. 1, fishing line 22 is relaxed and the weighted lure means at the trailing end 12 of the leader is sinking below the floating plug 1. In this position the lower portion of leader 11 assumes a position in substantial parallel relation to the shanks of hooks 6 and 8. By alternately pulling in and letting out line 22, the lure 14 may be raised and lowered in the water beneath the plug, as indicated by arrows 23. During such operation, it has been found that fish may strike plug 1, to become hooked on hooks 6 or 8, or that fish may strike lure 14 to become hooked on hook 16. On several occasions, two fish have been hooked substantially simultaneously, one on the plug hooks and one on the lure hook. The movement of lure 14 seems to attract the attention of fish and, apparently, tends to increase the attractiveness of the plug.

In the view of Fig. 2, the fishing line is being reeled in or the bait is being used for trolling. Leader 11 is seen to be taut, and the plug 1 rides at the water surface 2. Sharp jerks on the line will cause the plug to jump clear of the water, if desired. The design of the plug may be such as to provide surface action, such as a wiggling from side to side or periodic total immersion of the plug. It has been found that, during this type of trolling or reeling in operation, the lure 14 increases the effectiveness of the bait, and that fish will often strike a little below the plug to be hooked by hook 16 of the lure. Larger fish are, apparently, attracted to the plug in part by lure 14 and tend to take the whole plug. It will be noted that ball 13 has seated against the rearward end of the plug opening as a result of the forward pull on the leader, and that it is in a position freely to drop away whenever the leader is relaxed.

The relative positions of ball 13, lure 14 and hooks 6 and 8 shown in Fig. 2 are, also, substantially those assumed during casting of the bait. It will be apparent that hooks 6 and 16 are so positioned during casting, and at other times, as to be unlikely to tangle with each other, and it will further be apparent that hooks 8 are mounted sufficiently forwardly of the intermediate part of the under body portion from which the leader issues, as seen in Fig. 1, to prevent tangling of hooks 8 with the leader or with portions of the lure means. In the Fig. 2 position, the leader is drawn taut and the shanks of all the hooks 6, 8 and 16 lie in substantially parallel planes. In departing from the specific arrangement of the parts disclosed herein caution should be exercised that the parts are not so positioned as to permit tangling of the hooks with one another or with the leader.

While I have shown and described only certain preferred embodiments of my invention by way of illustration, many modifications will occur to those skilled in the art, and I therefore wish to have it understood that I intend, in the appended claims, to cover all such modifications as fall within the true spirit and scope of my invention.

What I claim as new and desire to secure by Letters Patent of the United States is:

1. The combination of a fishing lure, a leader, a line attachment, a spinner and hooks, wherein the fishing lure comprises a body greater in length than in cross section and having a downwardly and rearwardly inclined front face, a downwardly and rearwardly inclined passageway extending from the upper portion of the front face to substantially the central portion of the bottom surface of the lure, hook securing means on the rear end of the lure and on the bottom of the lure adjacent the bottom edge of the front face thereof, said hooks pivotally mounted on said securing means, the rear hook securing means having said spinner mounted thereon, said leader having a stop at one end thereof adjacent the line attachment and a second stop at the other end thereof, a portion of the leader between said stops extending entirely through said passageway for free movement therein and a weighted combined fish hook and lure means pivotally secured to the rear end of the leader at the rear of the second stop, whereby when in operating position in the water a portion of the leader will assume a position in substantial parallel relation to the shanks of the hooks on said securing means and when the leader is drawn taut during trolling the shanks of all hooks will lie in substantially parallel planes, thereby reducing to a minimum the possibility of entanglement of the leader and its fish hook with the other hooks and the spinner.

2. The combination of a fishing lure, a leader, a line attachment and hooks, wherein the fishing lure comprises a body greater in length than in cross section and having a downwardly and rearwardly inclined front face, a downwardly and rearwardly inclined passageway extending from the upper portion of the front face to substantially the central portion of the bottom surface of the lure, hook securing means on the rear end of the lure and on the bottom of the lure adjacent the bottom edge of the front face thereof, said hooks pivotally mounted on said securing means, said leader having a stop at one end thereof adjacent the line attachment and a second stop at the other end thereof, a portion of the leader between said stops extending entirely through said passageway for free movement therein and a weighted combined fish hook and lure means pivotally secured to the rear end of the leader at the rear of the second stop, whereby when in operating position in the water a portion of the leader will assume a position in substantial parallel relation to the shanks of the hooks on said securing means and when the leader is drawn taut during trolling the shanks of all hooks will lie in substantially parallel planes, thereby reducing to a minimum the possibility of entanglement of the leader and its fish hook with the other hooks.

3. The combination of a fishing lure, a leader, a line attachment and hooks, wherein the fishing lure comprises a body greater in length than in cross section and having a front face extending across the forward end of said body, a downwardly and rearwardly inclined passageway extending from the upper portion of the front face to substantially the central portion of the bottom surface of the lure, hook securing means on the rear end of the lure and on the bottom of the lure adjacent the bottom edge of the front face thereof, said hooks pivotally mounted on said securing means, said leader having a stop at one end thereof adjacent the line attachment and a second stop at the other end thereof, a portion of the leader between said stops extending entirely through said passageway for free movement therein and a weighted combined fish hook and lure means pivotally secured to the rear end of the leader at the rear of the second stop, whereby when in operating position in the water a portion of the leader will assume a position in substantial parallel relation to the shanks of the hooks on said securing means and when the leader is drawn taut during trolling the shanks of all hooks will lie in substantially parallel planes, thereby reducing to a minimum the possibility of entanglement of the leader and its fish hook with the other hooks.

References Cited in the file of this patent

UNITED STATES PATENTS

| Number | Name | Date |
|---|---|---|
| 360,339 | Cooke | Mar. 29, 1887 |
| 786,597 | Picken | Apr. 4, 1905 |
| 1,089,915 | Evans | Mar. 10, 1914 |
| 1,390,458 | Moree | Sept. 13, 1921 |
| 2,007,045 | Francis | July 2, 1935 |
| 2,112,901 | Anderson | Apr. 5, 1938 |
| 2,333,590 | Schueller | Nov. 2, 1943 |
| 2,406,252 | Potter | Aug. 20, 1946 |
| 2,439,621 | Himottu | Apr. 13, 1948 |
| 2,605,578 | Waterton | Aug. 5, 1952 |